United States Patent [19]

Meinzer

[11] Patent Number: 4,646,323
[45] Date of Patent: Feb. 24, 1987

[54] METHOD AND SYSTEM FOR DIGITAL DATA TRANSMISSION

[76] Inventor: Karl Meinzer, 38 Hohenweg, 3550 Marburg-1, Fed. Rep. of Germany

[21] Appl. No.: 534,249

[22] Filed: Sep. 21, 1983

[30] Foreign Application Priority Data

Oct. 11, 1982 [DE] Fed. Rep. of Germany ....... 3237619

[51] Int. Cl.$^4$ ............................................. H04L 27/00
[52] U.S. Cl. ...................................... 375/37; 364/728; 332/10
[58] Field of Search ...................... 375/37, 38, 96, 102, 375/1, 115; 364/728; 343/5 PN; 370/107; 332/9 R, 10

[56] References Cited

U.S. PATENT DOCUMENTS

| | | | |
|---|---|---|---|
| 2,671,896 | 3/1954 | Rosa | 343/5 PN |
| 3,573,819 | 4/1971 | Mason | 343/5 PN |
| 3,591,789 | 7/1971 | Hoffman | 375/96 |
| 3,634,765 | 1/1972 | Gutleber | 375/96 |
| 3,701,852 | 10/1972 | Sluijter et al. | 375/38 |
| 3,846,583 | 11/1974 | Boulter | 332/10 |
| 4,003,002 | 1/1977 | Snijders et al. | 332/10 |
| 4,070,550 | 1/1978 | Miller, Jr. et al. | 375/22 |
| 4,071,826 | 1/1978 | Miller, Jr. et al. | 375/22 |
| 4,112,498 | 9/1978 | Reiner et al. | 375/114 |
| 4,348,769 | 9/1982 | Kittel | 375/28 |
| 4,358,853 | 11/1982 | Qureshi | 375/60 |
| 4,403,331 | 9/1983 | Halpern et al. | 375/37 |
| 4,445,223 | 4/1984 | Jasper et al. | 375/96 |
| 4,472,814 | 9/1984 | Gutleber | 375/96 |
| 4,479,099 | 10/1984 | Atobe | 332/10 |
| 4,510,611 | 4/1985 | Dougherty | 375/8 |

Primary Examiner—Robert L. Griffin
Assistant Examiner—Stephen Chin
Attorney, Agent, or Firm—Morton J. Rosenberg

[57] ABSTRACT

A system and method for digital transmission of pulses of a predetermined duration includes a transmitter (30) and a receiver (40). A data stream ($a_i$) is transformed into a narrow band signal spectrum and following transmission is demodulated to a data stream ($a_i$). In one form of the invention concept, a Delta function spectrum is converted into a quasi-rectangular transmitter spectrum by appropriate filters (26). In the receiver (40), a filter (28) is employed for data recovery. Data symbols which are received by the receiver (40) are decoupled by using periodic zeros of an autocorrelation function obtained at the receiver output filter. The shape factor of filters used in the overall system is selected to be preferably within the approximate range of 1.0–3.0. By selecting suitable slope responses of the aforementioned filters, the duration of the autocorrelation function and the resulting systems may be controlled for optimized results.

22 Claims, 9 Drawing Figures

4,646,323

METHOD AND SYSTEM FOR DIGITAL DATA TRANSMISSION

BACKGROUND OF THE INVENTION

1. Field of the Invention

This invention relates to a method and system for digital transmission of pulses of predetermined rate or pulse width. In particular, this invention relates to a method of transmitting a data stream from a transmitter wherein said data stream has a narrow band signal spectrum. More in particular, this invention relates to a system where digital data to be transmitted is modulated in the frequency domain resulting in a substantially rectangular signal spectrum which is reconverted in a receiving unit into a data stream. Still further, this invention relates to recovery of a data stream being transmitted through demodulation of a narrow band signal spectrum output from a transmitter and using periodical zeros of an auto-correlation function of the narrow band signal spectrum while limiting the effective duration of the auto-correlation function.

2. Prior Art

Methods and systems for digital data transmission are known in the prior art. In some prior art systems, in order to transmit digital data to radio transmitters or cable, modulation techniques are used to place the transmission into specific frequency ranges. Due to the fact that the data is generally discontinuous, such results in signal spectra which have a slow decay with increasing distance from a center frequency.

In prior art systems and methods for digital data transmission, conventional modulation techniques with regard to bandwidth or power requirements fall far short of the theoretical limits attainable. In some prior art systems where bandwidth considerations are optimized, the ratio of energy/bit (Eb) to spectral noise power (No), which is the signal to noise ratio is extremely inefficient. Opposingly, where Eb/No considerations are optimized, such has been accomplished at the expense of a greater bandwidth.

In some prior art system and method techniques, an attempt was made to reduce the required bandwidth using the concept of optimizing the shapes of the data pulses within the bit duration. This has led to an improved spectral decay at frequencies displaced from the center frequency, however, such improved spectral decay was obtained at the expense of an increased bandwidth close to the center frequency. Such prior art methods and systems are known as minimum shift keying (MSK) as well as various pulse formed versions of quadrature phase shift keying (QPSK). In such prior art systems, symbol duration was considered to be by necessity shorter or equal to the bit duration, and thus, an extended spectra for MSK and variants of phase shift keying was previously in such prior art systems and methods deemed acceptable.

In other prior art systems, such as those known as correlative coding, partial response signalling, and some form of Nyquist filtering, there have been made attempts to reduce the bandwidths by symbol expansion beyond a singular bit length. However, this has necessitated a symbol separation by using a suitable linear combination of adjacent symbols. Such prior art systems provided for the disadvantage of a deterioration of the Eb/No. Thus, due to the low ratio of complexity vs. performance, such prior art methods and systems have not been used extensively.

SUMMARY OF THE INVENTION

A method for digital transmission of pulses of a predetermined duration which includes the step of transmitting a modulated data stream from a transmitter having a narrow band signal spectrum. Additionally, the digital transmission method includes recovering the data stream by demodulating the narrow band signal spectrum in a receiver. Both the steps of transmitting and recovering use periodical zeros of an auto-correlation function of the narrow band signal spectrum, as well as limiting the effective duration of the auto-correlation function. The effective duration of the auto-correlation function is less than a predetermined multiple of the pulse duration.

An overall object of the subject method and system for digital data transmission is directed to providing a reduction of the bandwidth requirements in transmitting digital data without affecting the transmission quality which greatly improves the spectrum economy over prior art systems.

DESCRIPTION OF THE PREFERRED EMBODIMENTS

Figure 1:
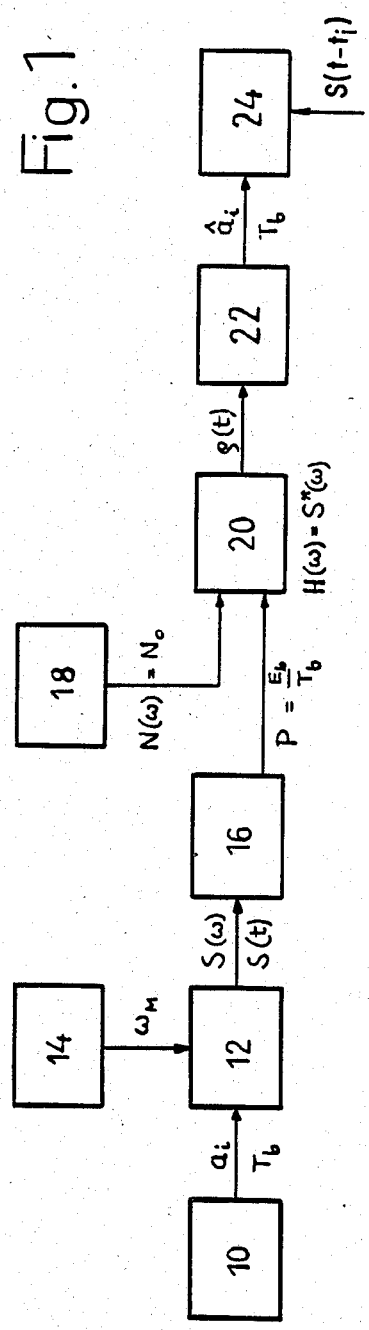
FIG. 1 is a block diagram of a conceptual model of the method and system for digital data transmission.

Referring now to FIGS. 1-4 and 9, there is shown the method and system for digital data transmission directed to the inventive concept as herein described. In accordance with the invention concept, digital data to be transmitted is initially subjected to a modulation process in the frequency domain which results in an approximating rectangular spectrum which is then reconverted in a receiving unit into the data stream. The modulation process in the frequency domain may further use conversions to intermediate frequencies. Both transmitter 30 and receiver 40 use filters to be described in following paragraphs. Initially, a transmitter generated spectrum approximates a Delta function by pulses 5.0–10.0 times shorter than the data stream bit duration. Pulse response of series connected transmitter and receiver filters exhibit zeros after each bit duration, which are used to decouple individual symbols.

Decoupling of individual symbols provides for no crosstalk between symbols since at each bit sampling point, all other responses are zero and thus decoupled if the data rate is matched to the zeros spacing. The finite slope selectivity of filters are chosen according to the invention concept in a manner such that the pulse response decays exponentially beyond the range of ±5.0 bit periods. Thus, extended durations of the data pulses do not pose an obstacle to the data transmission system even with tolerance considerations taken into account. An error rate of $P_e = 10^{-6}$ without coding has been found feasible with power requirements of $E_b/N_o = 10.5$ dB, which corresponds to the best known prior art techniques. Prior art systems and techniques do not generally allow channel spacings below 2.0–4.0 times the inverse bit duration, however, the subject invention method and system allows a channel spacing of 0.6–0.7 times the inverse bit duration resulting in a spectrum economy improvement over such prior art systems by a factor of 3.0–6.0.

In following paragraphs, the method and system for digital data transmission is generally described using phase shift keying (PSK) in an illustrative manner, however, with incoherent techniques such as frequency shift keying (FSK), significant advantages over prior art systems may also be obtained. Systems and methods in accordance with the inventive concept as herein described may be combined with substantially all modulation principles which result in reduced hardware complexity for a given error rate, compared to conventional techniques now being used.

The subject method and system as herein described is especially advantageous with respect to high data rates in the 100.0 Mbit-range due to the fact that system elements do not require any manipulation during the bit duration in contradistinction to conventional procedures and thus are less critical with respect to achievable frequency limits.

In order to provide theoretical insight into the inventive concept, it will be assumed that the transmitter input in general received a data stream using binary data which gives information in the form of two different voltage levels changing at periodic intervals. A unit data pulse is given by a rectangular wave form, whose spectrum is provided by Fourier transform:

$$S(t) = \begin{cases} 1 & -\frac{T}{2} < t < \frac{T}{2} \\ 0 & t > \frac{T}{2} \,;\, t < -\frac{T}{2} \end{cases} \quad (1)$$

$$S(\omega) = \int_{-\infty}^{\infty} S(t) e^{-j\omega t} dt \triangleq \frac{\sin\left(\omega \frac{T}{2}\right)}{\omega \frac{T}{2}} \quad (2)$$

wherein:
$\omega$ = frequency
$t$ = time
$T$ = period
$S(\omega)$ = spectral function In accordance with the inventive concept, the role of frequency and time are reversed as follows:

$$S(\omega) = \begin{cases} 1 & -\frac{\Omega}{2} < \omega < \frac{\Omega}{2} \\ 0 & \omega > \frac{\Omega}{2} \,;\, \omega < -\frac{\Omega}{2} \end{cases} \quad (3)$$

$$S(t) = \int_{-\infty}^{\infty} S(\omega) e^{j\omega t} d\omega \triangleq \frac{\sin\left(\frac{\Omega}{2} t\right)}{\frac{\Omega}{2} t} \quad (4)$$

Figure 4:
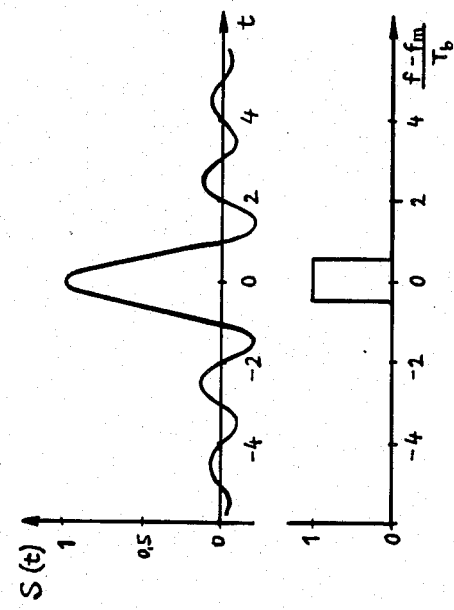
FIG. 4 is a graphical spectrum signal vs. normalized bandwidth referenced to data rate graph showing conversion of a data stream to a narrow band signal spectrum.

The resulting time response curve is shown in FIG. 4 and initially appears to exclude the above procedure, since individual data signal portions overlap which result in interference between symbols. Additionally, the signal does not disappear in the range of $-\infty \to +\infty$ which implies an infinite delay of the data stream. In accordance with the invention, the transmitted spectrum results from a filter having finite slopes. The receiver filter to be further described in following paragraphs, includes a characteristic of $H^*(\omega) = S(\omega)$, which is the conjugate complex response of the transmitter spectral function $S(\omega)$. This type of a filter is a matched filter which leads with white noise to an optimization of the elimination of interference.

The generation of the transmitted signal may then be viewed as a filtering of a constant spectrum, that of the Dirac Delta function. The pulse response A (t) of the two series connected filters of the transmitter and the receiver may be calculated by means of the Fourier transformation $H(\omega) \cdot H^*(\omega) = |H|^2(\omega)$, as follows:

$$H(\omega) \begin{cases} 1 & -\frac{\Omega}{2} < \omega < \frac{\Omega}{2} \\ 0 & \omega > \frac{\Omega}{2} \,;\, \omega < -\frac{\Omega}{2} \end{cases} \quad (5)$$

The resulting filter spectrum is as follows:

$$A(t) = \frac{1}{2\pi} \int_{-\infty}^{\infty} |H|^2(\omega) e^{j\omega t} d\omega \triangleq \frac{\sin\left(\frac{\Omega}{2} t\right)}{\frac{\Omega}{2} t} \quad (6)$$

Due to the identity of the two spectral responses, the theory of Chintchin will cause the result that at the output of the receiver, the auto-correlation function of the transmitted spectrum becomes available in the form:

$$\rho(t) = \frac{1}{2\pi} \int_{-\infty}^{\infty} |S|^2(\omega) e^{j\omega t} d\omega \triangleq \frac{\sin\left(\frac{\Omega}{2} t\right)}{\frac{\Omega}{2} t} \quad (7)$$

Where:
$\rho(t)$ = autocorrelation function

The above-referenced function has periodical zeros spaced at $T_b$. Data pulses transmitted at the time of the zeros do not interact. Thus, a new data pulse may be transmitted at each $T_b$ time unit without any crosstalk between the individual symbols. If an appropriate data rate is selected according to the spacing of the zeros of the autocorrelation function, large duration of the individual data pulses does not provide any problem areas.

However, a large or extended duration may result in crosstalk between individual symbols if the system tolerances result in small differences between data rates and the effective filter bandwidth. The subject invention concept minimizes and essentially eliminates this possible problem area by exploiting the finite slope response of appropriate filters. In practice, obtainable responses differ from ideal rectangular responses. The subject invention concept utilizes filters having shape factors (bandwidth at −60.0 dB vs. −6.0 dB) approximating and not significantly exceeding 2.0, which are well known to those knowledgeable in the art. In the range of ±4.0 $T_b$, the autocorrelation function may be formed to provide a similar response to that of an ideal filter and in particular, to have the same zeros. The periodicity is given by the inverse 3.0 dB bandwidth of the filter. However, at times of ±5.0 $T_b$ or greater, the autocorrelation function substantially disappears exponentially and thus significantly faster than that found with an ideal filter. Thus, even with fairly steep filters after ±10.0 $T_b$, the signal has decayed sufficiently to render the residue as unimportant.

The above-referenced paragraphs thus show that the invention concept as herein described creates a possibility to interchange time and frequency for the modulation. The periodicity of the zeros of the autocorrelation function are used to decouple the data symbols if a substantially rectangular spectral response is created using appropriate filters. The potential problem of large or extended duration of individual symbols may be made substantially insignificant by using filter responses that result in an exponential decay of the above-described type.

Referring now more specifically to FIG. 1, such directs itself to the digital data transmission concepts in general. The normally binary data ai at the input 10 are initially converted to a desired frequency by an appropriate modulation process. The desired frequency may be an intermediate frequency. Modulation block 12 is a modulation stage which is fed from generator 14 supplying a frequency $\omega M$ which is input into block 12. Modulation stage 12 produces the signal spectrum $S(\omega)$, which is received in transmission path or channel block 16 having a power $P = E_b/T_b$.

At the receiver, a filtering process block 20 is provided which receives the channel added noise input from noise source 18 and which has a response $N(\omega)$ equivalent to the conjugate complex of the signal spectrum $S^*(\omega)$. In this manner, the autocorrelation function $\rho(t)$ is created, which in turn is passed to decision element block 22 wherein data ai is fed to data output block 24.

Figure 2:
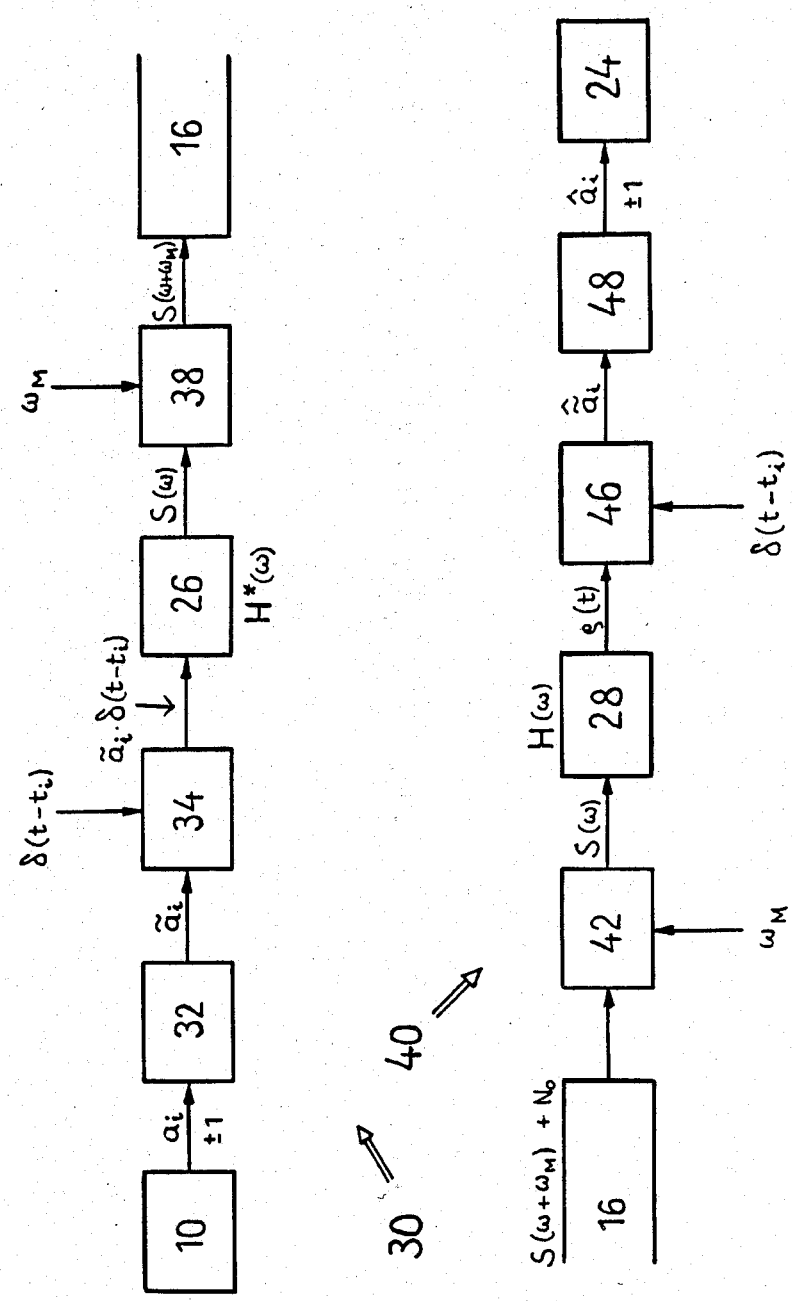
FIG. 2 is a circuit block diagram of a preferred embodiment of the method and system for digital data transmission.

Referring now to FIG. 2, there is shown a preferred embodiment of the overall digital transmission system, including transmitter 30 and receiver 40. An incoming data stream $a_i$ is passed through data input block 10 to differential encoder 32 which exits coded data $\tilde{a}_i$ to frequency converter or modulator 34. Modulator 34 creates an approximating Delta function using pulses 5.0–10.0 times shorter than the bit duration $T_b$.

With the Delta pulse $\delta(t-t_i)$, converter or modulator 34 creates a modulated signal $a_i \cdot \delta(t-t_i)$ which passes to low pass filter 26 with a response $H^*(\omega)$. The signal spectrum $S(\omega)$ which originates from low pass filter 26 is then inserted to frequency converter 38 which results in signal spectrum $S(\omega_M + \omega)$, which is transposed by $\omega_M$. The signal spectrum leaving frequency converter 38 is then inserted into communication channel 16.

Receiver 40 receives the above-referenced spectrum together with white noise No. Frequency converter 42 being a suitable mixer stage eliminates frequency $\omega_M$. Signal spectrum $S(\omega)$ is now fed into receiver low pass filter 28 which serves as a receiver filter with a response of $H(\omega)$ and which creates the autocorrelation function $\rho(t)$.

The autocorrelation function is then inserted into interrogation gate 46 which is controlled by the above-referenced Delta function $\delta(t-t_i)$. The demodulated symbols $\hat{a}_i$ are then inserted and decoded in differential decoder 48 and data $\hat{a}_i$ is inserted to data output block 24, where the recovered data $\hat{a}_i$ is made available.

The rectangular spectrum modulation with the system shown in FIG. 2 is accomplished at frequencies close to the data rate (baseband). Actual experiments with a system as shown for a data rate of 10.0K bit per /s has demonstrated that a signal power of Eb/No =11.0 dB is needed for an error rate in the order of $10^{-6}$. The single side bandwidth is 5.0 KHz and it has been found that at 7.5 KHz the signal was down to approximately −70.0 dB.

Figure 3:
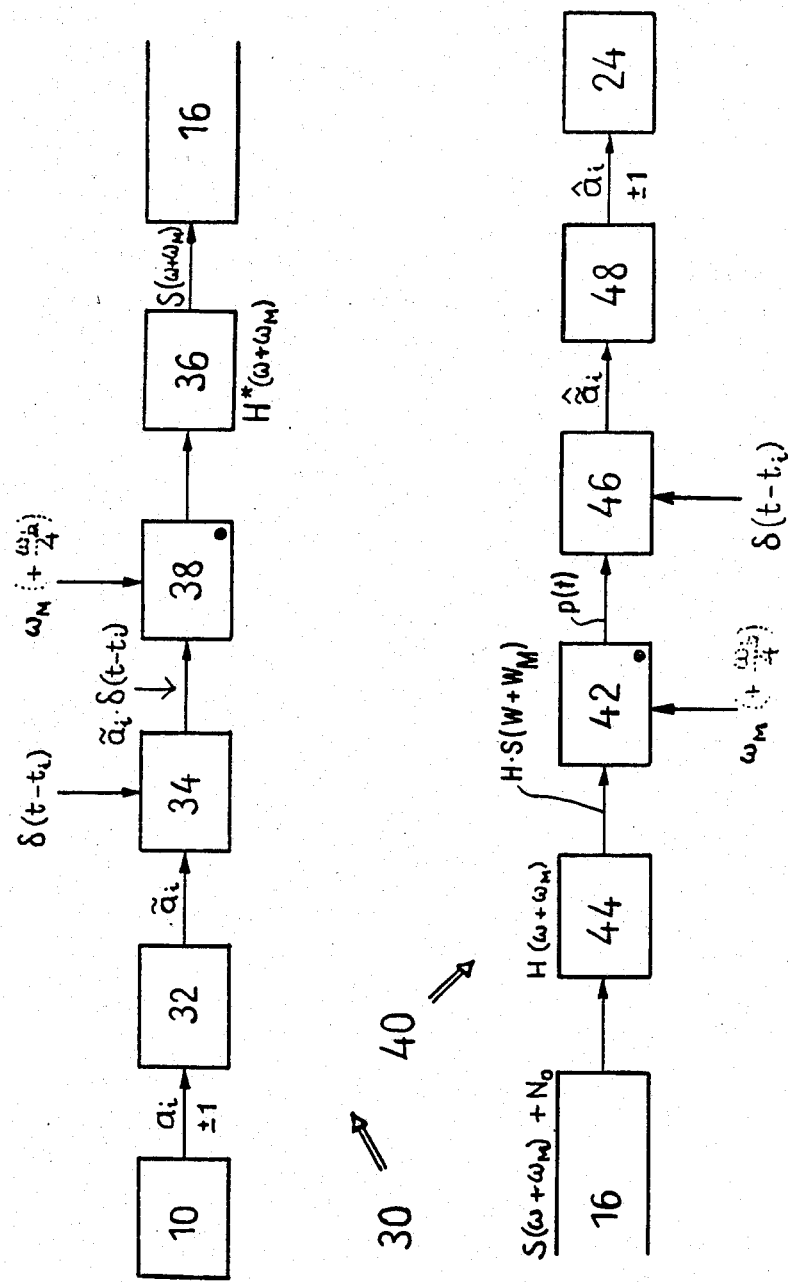
FIG. 3 is a circuit block diagram of an embodiment of the method and system for digital data transmission.
Figure 5:
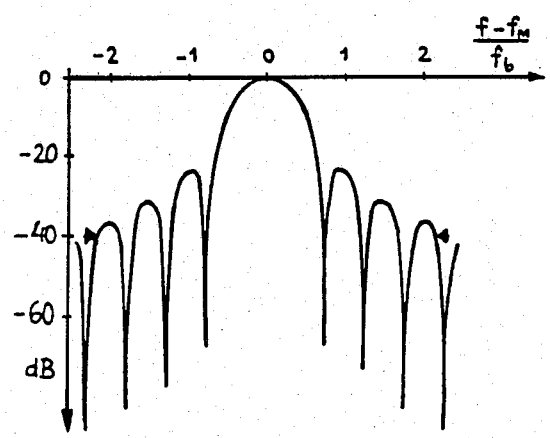
FIG. 5 is a graphical spectral response curve of minimum shift keying (MSK)
Figure 8:
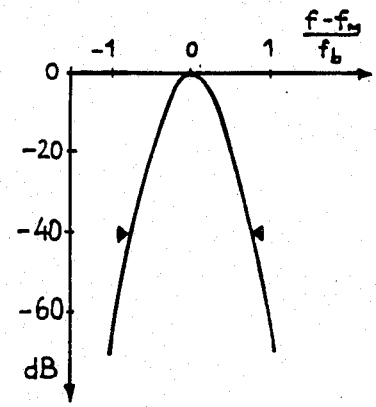
FIG. 8 is a graphical diagram of the spectrum of correlative phase shift keying (COR-PSK) as described in "New Digital Phase Modulation Methods to Establish Digital Phase Modulation Methods to Establish Digital Voice Transmission in Mobile Radio Networks with Optimum Spectrum Efficiency" by J. Noordanus, published in Telecom 1979 Proceedings; and, FIG. 9 is a graphical representation of the spectral response of the subject method and system for digital data transmission.
Figure 6:
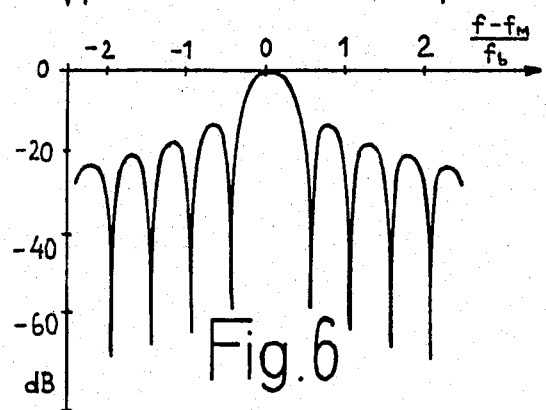
FIG. 6 is a graphical spectral response of 90° quadrature phase shift keying (QPSK)

Referring now to FIG. 3, there is shown an embodiment of the system in accordance with the invention concept as has hereinbefore been described. The system shown in FIG. 3 creates a substantially rectangular spectrum modulation with high frequency filters at intermediate frequencies having a frequency offset of $$\omega_M + \frac{\omega_b}{4}.$$

The construction of the system shown in FIG. 3 is similar to the system of FIG. 2, however, frequency converter 28 and bandpass filter 36 at transmitter 30 are interchanged and similarly converter 42 and filter 44 in receiver 40 are also interchanged. With high data rates and appropriate choice of intermediate frequency, filters 36 and 44 may be directly exited by Delta function $\delta(t-t_i)$ devoid of modulators 38, 42.

Through use of a suitable frequency and data phase offset, multiple phase modulation may be provided without additional hardware elements. With the exception of receiver interrogation gate 46, and Delta pulse generator in transmitter modultor 34, no devices or elements are necessary having a time resolution exceeding that of the data rate. This eliminates the normal compromises which are normally necessary at high data rates, i.e., the impossibility to build an integrate and dump filter in the 100.0 M bit/s range. In receiver 40, only a periodical interrogation of filter 44 is required. Thus, the reception of the transmitted spectrum is less complex than with more conventional forms of PSK modulated signals.

Bit frequency recovery at low or high data rates is easily accomplished by using the zero transitions at receiver filter 44 output using standard well-known methods in the art. The remainder of the circuitry as shown requires only standard circuit technology for carrier frequency recovery.

Figure 9:
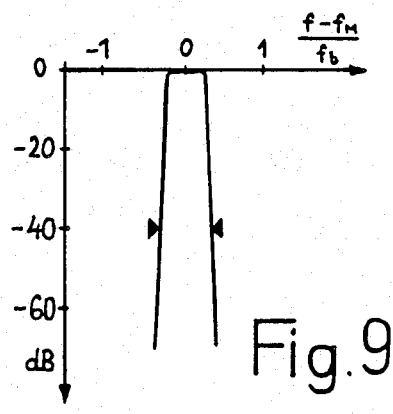
Figure 7:
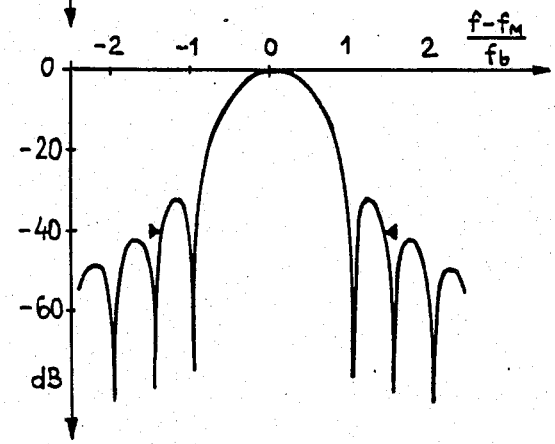
FIG. 7 is a graphical spectral response showing a QPSK variation with pulses contoured in accordance with $S(t) = \frac{1}{2} + \frac{1}{2}(\cos \pi t / Tb)$.

Referring to FIG. 9, such shows the spectral response attainable by utilization of techniques of the invention concept as hereinbefore described. In FIG. 9, as well as in FIGS. 5–8, the reference bandwidth is soon to be the point where the spectral density for the initial time has dropped below −40.0 dB. Comparison of FIGS. 5–8 showing the prior art systems and methods, with FIG. 9 graphically demonstrate the improvements afforded by the invention concept system and method.

With two phase modulation, the carrier frequency recovery is less critical, thus, making it particularly suitable for lower data rates. The transmitted signal does not possess a constant envelope and the peak power is approximately twice the average power. In order to retain the narrow bandwidth of the original signal, linear amplification is necessary throughout.

Four phase modulation without data phase offset, cuts the required bandwidth by one-half. The envelope resembles that of two phase modulation, and the carrier frequency recovery is more demanding than that with two phase systems.

Data phase offset with four phase modulation similarly leads to a full spectrum economy and results in particularly simple circuitry. The envelope found is fairly constant and amplitude limiting of the signal does not significantly deteriorate the spectral quality of the transmission.

The bit error rate (BER) corresponds to that of the best known prior art and conventional modulations. With low data rates, two phase rectangular spectrum modulation is capable of providing substantially the same spectral economy as four phase systems because of carrier recovery constraints and the frequency uncertainties of actual operating systems.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended Claims.

What is claimed is:

1. A method for digital transmission of pulses of a predetermined duration including the steps of:
   (a) transmitting a data stream from a transmitter having a narrow band signal spectrum including the steps of modulating said data stream by an approximating Delta function; and,
   (b) recovering said data stream by demodulating said narrow band signal spectrum by an approximate Delta function at a receiving end, said steps of transmitting and recovering (1) using periodical zeros of an autocorrelation function of said narrow band signal spectrum, and (2) limiting the effective duration of said autocorrelation function, said effective duration being less than a predetermined multiple of said pulse duration.

2. The method for digital transmission as recited in claim 1 where said narrow band signal spectrum is substantially orthogonal.

3. The method of digital transmission as recited in claim 1 where the step of transmitting said modulated data stream includes the steps of:
   (a) coding said data stream;
   (b) establishing said narrow band signal spectrum; and,
   (c) outputting said narrow band signal spectrum from said transmitter.

4. The method of digital transmission as recited in claim 3 where the step establishing said narrow band signal spectrum includes the steps of:
   (a) filtering said modulated data stream through a low pass filter having a predetermined response; and,
   (b) further modulating said modulated data stream by a predetermined frequency.

5. The method of digital transmission as recited in claim 3 where the step of establishing said narrow band signal spectrum includes the steps of:
   (a) further modulating said data stream by a predetermined frequency having a predetermined phase offset; and,
   (b) filtering said further modulated data stream through a band pass filter having a predetermined response.

6. The method of digital transmission as recited in claim 1 where the step of recovering said data stream includes the steps of:
   (a) establishing said autocorrelation function from said received narrow band signal spectrum;
   (b) demodulating said autocorrelation function by an approximating Delta function;
   (c) establishing a data stream; and,
   (d) decoding said data stream for recovery of transmitted data.

7. The method of digital transmission as recited in claim 6 where the step of establishing said autocorrelation function includes the steps of:
   (a) demodulating said narrow band signal spectrum by a predetermined frequency to provide a signal spectrum; and,
   (b) filtering said signal spectrum through a low pass filter having a predetermined response.

8. The method of digital transmission as recited in claim 6 where the step of establishing said autocorrelation function includes the steps of:
   (a) filtering said narrow band signal spectrum through a band pass filter having a predetermined response; and,
   (b) demodulating said filtered signal spectrum by a predetermined frequency having a predetermined phase offset.

9. The method of digital transmission as recited in claims 3 or 6 where said approximating Delta function is formed of individual pulses having a pulse width within the approximating range of 5.0 to 10.0 times less than a pulse width of individual pulses of said data stream.

10. The method of digital transmission as recited in claim 1 where said effective duration of said autocorrelation function is less than ten times said pulse duration.

11. The method of digital transmission as recited in claims 4, 5, 7 or 8 where said predetermined filter response provides a substantially exponential decay output pulse in response to a predetermined input pulse.

12. The method of digital transmission as recited in claim 1 where said data stream pulses are substantially coincident with said periodical zeros of said autocorrelation function.

13. The method of digital transmission as recited in claims 4 or 5 where the step of further modulating is accomplished utilizing a conversion to an intermediate frequency.

14. A digital data transmission system for transmitting and receiving a digital data stream having pulses of predetermined duration and having a predetermined data rate, comprising:

(a) transmitter means for transmitting an approximating Delta function carrier signal, modulated by said digitial data stream, having a predetermined frequency band, said approximating Delta function having a predetermined data rate and a pulse duration substantially less than said pulse duration of said digital data stream, said transmitter means including a digital transmitter filter in series relation with said modulated Delta Function carrier signal, said transmitter means including a Delta pulse generator for generating a transmitter approximating Delta Function forming said carrier signal; and, (b) receiver means for recovering said digital data stream by demodulation of a transmitted signal having said predetermined frequency band of said transmitted carrier signal, with a receiver approximating Delta function, said receiver means including a digital receiver filter in series relation with said modulated Delta function carrier signal of said predetermined frequency band, said receiver approximating Delta function having substantially an equivalent pulse duration and data rate as said transmitter approximating Delta function.

15. The digital data transmission system as recited in claim 14 wherein a center frequency for each of said digital receiver and transmitter filters are matched in a manner such that each of said center frequencies is a predetermined multiple of said data rate.

16. The digital data transmission system as recited in claim 15 including means for controlling polarity of a plurality of pulses, said means for controlling polarity having a data phase offset for generating four phase transmitted signals.

17. The digital data transmission system as recited in claim 14 where said receiver means includes an interrogation gate for recovering a non-decoded demodulated signal.

18. The digital data transmission system as recited in claim 14 wherein said digital transmitter filter and said digital receiver filter are matched in a manner such that said digital receiver filter characteristic is the complex conjugate of the characteristic of said digital transmitter filter.

19. The digital data transmission system as recited in claim 17 where said receiver means includes a decision element coupled to said interrogation gate.

20. The digital data transmission system as recited in claim 15 including digital delay means for providing a data phase offset of 180° to provide a substantially constant envelope of a transmitted signal.

21. The digital data transmission system as recited in claim 15 including frequency conversion means for producing multiple pulses within a predetermined duration providing multiphase output signals, said filter center frequencies being offset with respect to a carrier frequency.

22. The digital data transmission system as recited in claim 14 where said Delta pulse generator is polarity switchable to provide two phase antipodal signals.

* * * * *